(12) United States Patent
Laufer et al.

(10) Patent No.: US 9,062,153 B2
(45) Date of Patent: Jun. 23, 2015

(54) COMPOSITIONS, PREPARATION THEREOF AND USE THEREOF FOR PRODUCTION OF CAST POLYAMIDES

(71) Applicant: Rhein Chemie Rheinau GmbH, Mannheim (DE)

(72) Inventors: Wilhelm Laufer, Ellerstadt (DE); Andre Palzer, Reilingen (DE); Volker Wenzel, Heddesheim (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 14/265,516

(22) Filed: Apr. 30, 2014

(65) Prior Publication Data

US 2014/0336350 A1    Nov. 13, 2014

(30) Foreign Application Priority Data

May 7, 2013   (EP) .................................... 13166722

(51) Int. Cl.
*C08G 69/20*  (2006.01)
*C08G 69/18*  (2006.01)

(52) U.S. Cl.
CPC ............... *C08G 69/18* (2013.01); *C08G 69/20* (2013.01)

(58) Field of Classification Search
USPC .................. 525/183, 185; 528/313, 314, 315
See application file for complete search history.

(56) References Cited

U.S. PATENT DOCUMENTS

| | | | |
|---|---|---|---|
| 3,637,608 A | 1/1972 | Schaaf | |
| 2012/0222809 A1* | 9/2012 | Scherzer et al. | 156/305 |
| 2012/0245320 A1 | 9/2012 | Laufer et al. | |
| 2012/0283406 A1 | 11/2012 | Klitschke et al. | |

FOREIGN PATENT DOCUMENTS

CA          865809 A       3/1971

OTHER PUBLICATIONS

European Search Report from co-pending Application EP13166722 dated Sep. 3, 2013, 2 pages.
European Search Report from co-pending Application EP14167193 dated Jul. 22, 2014, 2 pages.

* cited by examiner

*Primary Examiner* — Terressa Boykin

(57) ABSTRACT

The present invention relates to novel compositions, to the preparation thereof and to the use thereof for the production of cast polyamides.

10 Claims, No Drawings

COMPOSITIONS, PREPARATION THEREOF AND USE THEREOF FOR PRODUCTION OF CAST POLYAMIDES

The present invention relates to novel compositions, to the preparation thereof and to the use thereof for the production of cast polyamides.

Cast polyamides are polyamides of particularly high molecular weight. In the preparation of cast polyamides, a lactam is poured into a mould together with at least one catalyst and at least one activator and is then anionically polymerized in this mould. The starting compounds present in the mould generally polymerize under the action of heat. This gives rise to a homogeneous material superior to extruded polyamides in terms of crystallinity.

Cast polyamides are suitable as thermoplastics for the manufacture of complex components. Unlike many other thermoplastics, they need not be melted, but form through an ambient-pressure anionic polymerization of a lactam in a mould at 120 to 160° C. within only a few minutes. It is possible here to employ any of the known casting methods, such as stationary casting, rotary casting and spin-casting. The end product obtained in each case are mouldings of a high molecular weight, crystalline polyamide which features a low weight, a high mechanical durability, very good sliding properties and an excellent chemical resistance, and which—since the moulds are not filled under pressure—has only low internal stresses. Cast polyamides can be sawed, drilled, machined, ground, welded and printed or painted; as well as complex hollow moulds, examples of other articles produced from this polymer are rollers for passenger elevators and semifinished products, for example tubes, bars and sheets for mechanical engineering and the automobile industry.

The production of polyamide castings proceeding from low-viscosity lactam melts and a catalyst, and also an activator, by what is called activated anionic polymerization, is known per se. For this purpose, typically two mixtures of catalyst and lactam and of activator and lactam are produced separately from one another in the form of a liquid melt freshly before the polymerization, mixed directly with one another and then polymerized in a casting mould (e.g. Vieweg, Müller; Kunststoff-Handbuch [Plastics Handbook], vol. VI, pages 42-60, Carl Hansa Verlag, Munich, 1966). The intention of this is to ensure that there can be no unwanted reaction beforehand.

The activators known in the prior art have the disadvantages that they are either solid activators that are difficult to meter or include liquid polyisocyanates in troublesome solvents.

It was thus an object of the present invention to provide compositions that do not have the disadvantages of the prior art, namely do not require any additional solvent, are nevertheless in liquid form, and are easy to meter as a result. Furthermore, they should have a high reactivity.

It has now been found that, surprisingly, compositions comprising N-acetylcaprolactam and at least one polyisocyanate based on hexamethylene diisocyanate (HDI) achieved this object and are usable as effective activators. They do not require any additional solvents, for example N-methyl-or N-ethylpyrrolidone or caprolactone.

The present invention therefore provides compositions comprising a) N-acetylcaprolactam

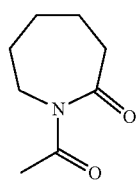

and b) at least one polyisocyanate based on hexamethylene diisocyanate (HDI) and/or optionally lactam-blocked, preferably caprolactam-blocked, polyisocyanate based on hexamethylene diisocyanate (HDI) selected from the group of HDI biuret, HDI uretdione, HDI isocyanurate and/or HDI allophanate. The HDI biuret is preferably a compound of the formula (I)

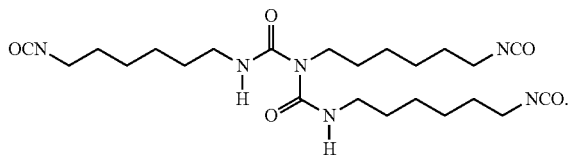

The aforementioned compound of the formula (I) is a commodity chemical and is available, for example, from Bayer MaterialScience AG under the Desmodur® N3200 trade name.

The HDI uretdione in the context of the invention is preferably a compound of the formula (II)

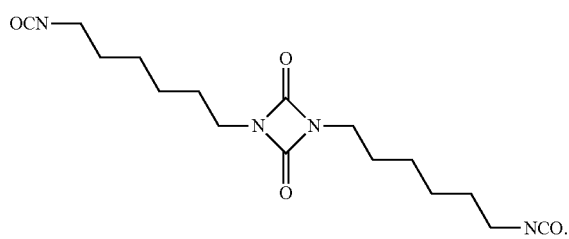

The aforementioned compound of the formula (II) is a commodity chemical and is available, for example, from Bayer MaterialScience AG under the Desmodur® N3400 trade name.

The HDI isocyanurate in the context of the invention is preferably a compound of the formula (III)

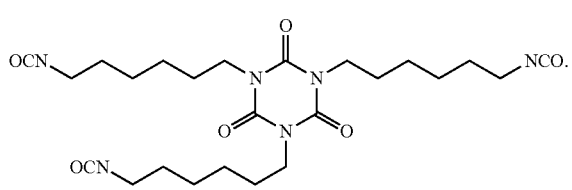

The aforementioned compound of the formula (III) is a commodity chemical and is available, for example, from Bayer MaterialScience AG.

The HDI allophanates in the context of the invention are compounds of the formula (IV)

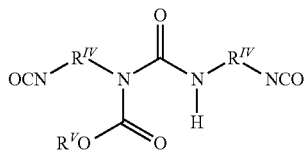

where $R^{IV}$ is —$(CH_2)_6$— and $R^V$ is $C_1$-$C_6$-alkyl.

The aforementioned compounds of the formula (IV) are commodity chemicals and are available, for example, from Bayer MaterialScience AG.

In a preferred embodiment of the present invention, the polyisocyanates based on hexamethylene diisocyanate (HDI) are blocked with lactam, more preferably with caprolactam.

Caprolactam-blocked HDI polyisocyanate can also be prepared in situ in the N-acetylcaprolactam. In this case, the ratio of N-acetylcaprolactam to caprolactam-blocked polyisocyanate is 50:50 to 20:80, preferably 40:60 to 30:70.

For in situ preparation of the inventive composition with the caprolactam-blocked HDI polyisocyanate, the caprolactam, as a melt or in solid form (flakes or pellets), is preferably dissolved in N-acetylcaprolactam and reacted with the polyisocyanate, preferably with a small caprolactam excess, at temperatures of 50-120° C., preferably 60-90° C., more preferably 70-80° C. The polyisocyanate is preferably preheated at temperatures of 30-80° C., more preferably 40-60° C., and metered into the caprolactam/N-acetylcaprolactam solution.

The N-acetylcaprolactam is a compound which is likewise a commodity chemical.

In a preferred embodiment of the present invention, the composition comprises at least one acid scavenger.

Preferred acid scavengers are epoxides and/or carbodiimides.

Carbodiimides in the context of the invention are preferably compounds of the formula (V)

in which
m in is an integer from 1 to 10,
$R^1$=—$R^2$—NCO, —$R^2$—NHCONHR$^4$, —$R^2$—NHCONR$^4$R$^5$ or —$R^2$—NHCOOR$^6$.
$R^2$=$C_1$-$C_{18}$-alkylene, $C_5$-$C_{18}$-cycloalkylene, arylene and/or $C_7$-$C_{18}$-aralkylene and
$R^3$=—NCO, —NHCONHR$^4$, —NHCONR$^4$R$^5$ or —NHCOOR$^6$,
where $R^4$ and $R^5$ in $R^1$ are the same or different and are each independently a $C_1$-$C_6$-alkyl, $C_6$-$C_{10}$-cycloalkyl or $C_7$-$C_{18}$-aralkyl radical and $R^6$ has one of the meanings of $R^2$ or is —$(CH_2)_l$—(O—$(CH_2)_k$—O)$_g$—$R^7$,
with l=1-3, k=1-3, g=0-12 and
$R^7$=H or $C_1$-$C_4$-alkyl.

It is likewise also possible to use mixtures of carbodiimides of the formula (V).

Epoxides in the context of the invention are preferably glycidyl ethers, preferably glycerol glycidyl ethers, commercially available under the Glycidyl ether GE 100 name from Raschig GmbH.

In a preferred embodiment of the present invention, the ratio of N-acetylcaprolactam to polyisocyanate based on hexamethylene diisocyanate (HDI) is 1:1 to 1:4.

In a preferred embodiment of the present invention, the proportion of acid scavenger is 0.1-2% by weight, more preferably 0.5-1% by weight, based on the composition.

The present invention additionally provides a process for preparing the inventive composition, in which N-acetylcaprolactam is mixed with a polyisocyanate based on hexamethylene diisocyanate (HDI) in a ratio of 50:50 to 20:80, preferably in a ratio of 40:60 to 30:70, optionally in the presence of carbodiimide and/or epoxide, at temperatures of 20 to 60° C.

In a further preferred embodiment of the present invention, a caprolactam-blocked HDI polyisocyanate is used.

The present invention preferably further provides a process for preparing the inventive composition comprising the caprolactam-blocked HDI polyisocyanate, by preparing the caprolactam-blocked HDI polyisocyanate in situ in the N-acetylcaprolactam. The ratio of N-cetylcaprolactam to caprolactam-blocked HDI polyisocyanate is 50:50 to 20:80, preferably 40:60 to 30:70.

For in situ preparation of the inventive composition comprising the caprolactam-blocked HDI polyisocyanate, the caprolactam, as a melt or in solid form (flakes or pellets), is preferably dissolved in N-acetylcaprolactam and reacted with the polyisocyanate, preferably with a small caprolactam excess, at temperatures of 50-120° C., preferably 60-90° C., more preferably 70-80° C. The polyisocyanate is preferably preheated at temperatures of 30-80° C., more preferably 40-60° C., and metered into the caprolactam/N-acetylcaprolactam solution.

The present invention additionally provides for the use of the inventive composition for polymerization of lactams, preferably of caprolactam, for production of polyamide castings.

The polymerization is preferably effected by the processes described in Kunststoffhandbuch, vol. 3/4, Technische Thermoplaste [Industrial Thermoplastics], Danser Fachbuch, pages 413-430.

In a further execution of the present invention, the polymerization can be conducted by a suitable shaping process, preferably an injection moulding, stationary casting or rotary casting process. Particular preference is given to polymerization by the injection moulding process.

The aforementioned inventive compositions are used preferably for production of plastics products as a substitute for metal, preferably in the automobile industry, in the production of electronic engineering parts, for the production of sheets, bars, tubes, rope pulleys, rope rollers, cogs and bearings, and/or for vessel manufacture.

The examples which follow serve to elucidate the invention, without having any limiting effect.

WORKING EXAMPLES

Reagents
Dry caprolactam (softening point >69° C.) from Lanxess Deutschland GmbH
Addonyl® Kat NL from Rhein Chemie Rheinau GmbH, approx. 18% sodium caprolactamate in caprolactam.
Addonyl®8108 activator, a hexamethylene diisocyanate (HDI) biuret, 70% in N-ethylpyrrolidone, commercially available from Rhein Chemie Rheinau GmbH,
Activator I, a caprolactam-blocked hexamethylene diisocyanate (HDI) biuret,
CDI Stabaxol® I TCC, monomeric aromatic carbodiimide, commercially available from Rhein Chemie Rheinau GmbH,
Desmodur® N3200, a hexamethylene diisocyanate (HDI) biuret from Bayer MaterialScience AG,
N-Acetylcaprolactam, in two qualities:
Quality I: purity of at least 98%, commercially available from Fluka Sigma Aldrich,
Quality II: quality I with a proportion of about 2% by weight of residual acetic acid.
Equipment
The apparatus used for melt preparation consisted of:
2 three-neck flasks (500 ml), heated in an oil bath
2 precision glass stirrers with sleeves
2 gas caps, 1 with and 1 without a tap
1 vacuum pump with cold trap and manometer.

The apparatus used for temperature measurement consisted of:
Testo 175-T3 thermometer with IR serial interface thermocouple to remain in the cured sample
600 ml beaker (high mould) and a
heater for the beaker (metal block, oil bath).

Example 1

Procedure and Measurement

Flask A was charged with 196.8 g of caprolactam and 3.2 g of activator, as specified in the table below, and flask B with 192 g of caprolactam and 8 g of Addonyl® Kat NL catalyst.

The melts from flasks A and B were prepared at 110-130° C. (±2° C.) in an oil bath under reduced pressure (<15 mbar) for 20 minutes.

After venting with nitrogen, components from flask A and flask B were combined in a three-neck flask, stirred briefly and transferred to the 600 ml beaker.

The mould temperature (beaker) was 160° C. The polymerization time was generally 10-20 minutes.

| Activator in flask A | Example | Pot life (s) | Viscosity [mPas] | Activator dissolved in solvent |
|---|---|---|---|---|
| Desmodur ® N3200 and N-acetylcaprolactam (70:30) | Inv. 1 | 460 | 180 | no |
| Activator I and N-acetylcaprolactam (60:40) | Inv. 2 | 460 | 90 | no |
| Activator I prepared "insitu" in N-acetylcaprolactam (60:40) | Inv. 3 | 460 | 90 | no |
| Addonyl ® 8108 | C1 | 380 | 120 | yes |
| N-Acetylcaprolactam (quality I) | C2 | 650 | 4 | no |
| Activator I | C3 | 270 | 26000 | no |
| N-Acetylcaprolactam (quality II) | C4 | >1000 (not determinable) | 4 | no |
| N-Acetylcaprolactam (quality II) + 2% CDI I | C5 | 800 | 4 | no |

Comparative Example = C,
Inventive = Inv.

In the inventive example Inv. 1, which proceeds from the inventive composition, in which N-acetylcaprolactam mixed with a polyisocyanate based on hexamethylene diisocyanate (HDI), it is clearly apparent that a fast pot life was achieved at 460 s. In addition, the viscosity is low, and so good metering is ensured and it is thus possible to dispense with the dissolving of the activators in an additional solvent.

It has been shown that, in the inventive example Inv. 2, which proceeded from the inventive composition comprising the caprolactam-blocked HDI polyisocyanate, a fast pot life was achieved at 460 s. At the same time, the viscosity is low at 90 mPas, and so good metering is ensured, and it is also possible to dispense with the dissolving of the activators in an additional solvent.

If only N-acetylcaprolactam is used as an activator, because of the slower pot life of 650 s (comparative example C2), a disadvantage arises in the processing compared to the inventive examples.

If only activator I is used, because of the high viscosity of 26 000 mPas, processing is possible only in a distinctly complicated manner (comparative example C3).

In addition, it was shown in the inventive example (Inv. 3) that the inventive composition comprising the caprolactam-blocked HDI polyisocyanate, where the caprolactam-blocked HDI polyisocyanate is prepared in situ in N-acetylcaprolactam, optimal processing is likewise ensured through short pot lives, a low viscosity and the omission of an additional solvent.

In comparative example C4, it was shown that the quality of the N-acetylcaprolactam activator has an influence on the pot life. This pot life slows to well above 1000 s when quality II is used (corresponding to technical grade quality), this still containing about 2% residual acetic acid compared to quality I. This disadvantage, as was shown in the inventive example C5, can be alleviated by the addition of a carbodiimide as an acid scavenger.

What is claimed is:
1. A composition comprising
a) N-acetylcaprolactam

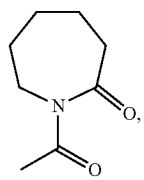

and
b) at least one, optionally caprolactam-blocked, polyisocyanate based on hexamethylene diisocyanate (HDI) wherein the polyisocyanate is selected from the group consisting of:

HDI biuret of the formula (I)

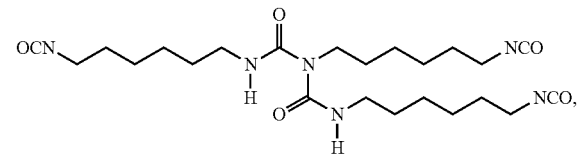

HDI uretdione of the formula (II)

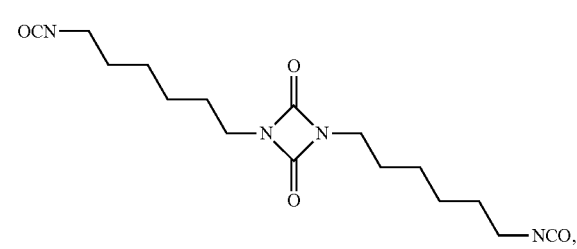

HDI isocyanurate of the formula (III)

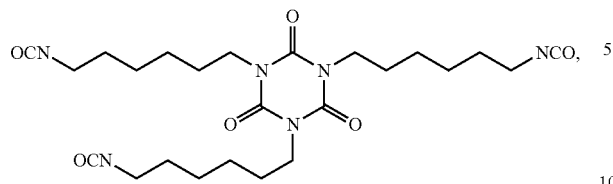

and
HDI allophanate of the formula (IV)

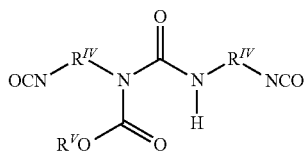

where $R^{IV}$ is $-(CH_2)_6-$ and $R^V$ is $C_1$-$C_6$-alkyl.

2. The composition according to claim 1, wherein the polyisocyanate based on hexamethylene diisocyanate (HDI) is caprolactam-blocked.

3. The composition according to claim 1, further comprising at least one acid scavenger.

4. The composition according to claim 3, wherein the acid scavenger comprises epoxides and/or carbodiimides.

5. The composition according to claim 4, wherein the carbodiimides are compounds of the formula (V)

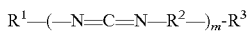

in which
m is an integer from 1 to 10,
$R^1=-R^2-NCO$, $-R^2-NHCONHR^4$, $-R^2-NHCONR^4R^5$ or $-R^2-NHCOOR^6$,
$R^2=C_1$-$C_{18}$-alkylene, $C_5$-$C_{18}$-cycloalkylene, arylene and/or $C_7$-$C_{18}$-aralkylene, and
$R^3=-NCO$, $-NHCONHR^4$, $-NHCONR^4R^5$ or $-NHCOOR^6$,
where $R^4$ and $R^5$ are the same or different and are each independently a $C_1$-$C_6$-alkyl, $C_6$-$C_{10}$-cycloalkyl or $C_7$-$C_{18}$-aralkyl radical, $R^6$ has one of the meanings of $R^2$ or is $-(CH_2)_l-(O-(CH_2)_k-O)_g-R^7$, with l=1-3, k=1-3, g=0-12, and $R^7=H$ or $C_1$-$C_4$-alkyl.

6. The composition according to claim 1, wherein a ratio of N-acetylcaprolactam to polyisocyanate based on hexamethylenediamine (HDI) is 1:1 to 1:4.

7. The composition according to claim 3, wherein a proportion of acid scavenger in the composition is 0.1-2% by weight based on the composition.

8. A process for preparing a composition according to claim 1, the process comprising mixing the N-acetylcaprolactam with the at least one, optionally caprolactam-blocked, polyisocyanate based on hexamethylene diisocyanate (HDI), at a temperature of 20° C. to 60° C., and optionally in the presence of at least one acid scavenger.

9. The process for preparing a composition according to claim 8, wherein the polyisocyanate is caprolactam blocked and the process further comprises preparing the caprolactam-blocked HDI polyisocyanate in situ in N-acetylcaprolactam.

10. The composition according to claim 3, wherein a proportion of acid scavenger in the composition is 0.5-1% by weight, based on the composition.

* * * * *